United States Patent [19]
Tanji et al.

[11] Patent Number: 4,994,634
[45] Date of Patent: Feb. 19, 1991

[54] SHEET SWITCH

[75] Inventors: Shigeo Tanji; Kazutoshi Hayashi; Hideo Yamada, all of Kawasaki; Norio Endoh, Suzaka, all of Japan

[73] Assignee: Fujitsu Limited, Kawasaki, Japan

[21] Appl. No.: 401,113

[22] Filed: Aug. 31, 1989

[30] Foreign Application Priority Data

Sep. 6, 1988 [JP] Japan ................................ 63-222901

[51] Int. Cl.[5] ........................ H01H 1/58; H01H 13/70; H01C 3/00; G06F 3/00

[52] U.S. Cl. .................................... 200/5 A; 200/512; 338/279; 338/280; 341/25

[58] Field of Search ................ 200/5 A, 5 R, 512-517; 341/22-27; 338/279, 280, 283, 284, 287

[56] References Cited

U.S. PATENT DOCUMENTS 4,146,759 3/1979 Watanabe et al. ........ 200/19 DR X
4,440,990 4/1984 Nozaki ................................ 200/5 A
4,463,338 7/1984 Utner ................................ 338/287 X
4,709,228 11/1987 Hucking et al. ...................... 341/25
4,804,940 2/1989 Takigawa et al. .............. 338/283 X

FOREIGN PATENT DOCUMENTS 60-39718 3/1985 Japan .

*Primary Examiner*—J. R. Scott
*Attorney, Agent, or Firm*—Staas & Halsey

[57] ABSTRACT

A sheet switch comprises a pair of flexible insulative films, one of which is provided with a plurality of electrodes, resistances connected to the electrodes, respectively, and line patterns for externally connecting the electrodes via the resistances. The other insulative film is also provided with a plurality of second electrodes at positions corresponding to the first electrodes, respectively, and a space is defined between each of the facing electrodes. The line pattern is a laminated structure consisting of an underlayer formed of a low resistance paste and an upper layer formed of a high resistance paste coated over the underlayer. The underlayer formed of a low resistance paste is partially disconnected to define a gap, so that the resistance is formed integrally with the upper layer formed of a high resistance paste at a position corresponding to the gap.

16 Claims, 5 Drawing Sheets

SHEET SWITCH

BACKGROUND OF THE INVENTION

1. Field of the Invention

This invention relates to a sheet or membrane switch, hereinafter referred to as a "sheet switch", and more particularly, to such a sheet switch which can be advantageously used as a N-key roll-over switch matrix for constituting, for example, a key board switch.

2. Description of the Related Art

Recently sheet switches are widely used as an input means for various apparatuses, as such a sheet switch has a relatively simple construction and is less expensive. Nevertheless due to a requirement for a high speed input, a plurality of keys (N-keys) are sometimes depressed simultaneously and this causes a "bypass signal flow". Accordingly, an appropriate means of effectively preventing or detecting such a bypass signal flow is urgently required.

A known N-key roll-over switch matrix comprises a plurality of X-lines connected to a detection circuit, and a plurality of Y-lines connected to a drive circuit, as shown in FIG. 8. The respective X-lines and Y-lines are connected by a plurality of switch elements and diodes, and each of the switch elements has one end connected to the X-line and the other end connected to the diode connected to the Y-line. The diodes serve to prevent a "bypass signal flow" from the drive circuit to the detection circuit, but such a switch matrix is not suitable for use as a sheet switch, since a plurality of diodes are included therein.

An N-key roll-over type switch matrix which uses a plurality of resistance in place of diodes, as shown in FIG. 9, is also known, but such a known matrix switch usually includes a circuit board on which electrodes, conductive patterns, and resistances are formed.

SUMMARY OF THE INVENTION

Therefore, an object of the present invention to provide a sheet switch which can be advantageously used for an N-key roll over type switch matrix constituting, for example, a key board switch.

Another object of the present invention is to provide such a sheet switch having a simple construction and low cost.

According to the present invention, there is provided a sheet switch comprising: an insulative film spacer having a plurality of through holes, the spacer being laminated between a pair of flexible insulative films; one of the insulative films being provided, on a surface thereof facing the spacer, with a plurality of first electrodes at positions corresponding to the through holes in the spacer, respectively, resistances connected to the first electrodes, respectively, and first line patterns for externally connecting the first electrodes via the resistance; each of the first line patterns being a laminated structure consisting essentially of an underlayer formed of a relatively low resistance paste and an upper layer formed of a relatively high resistance paste and coated over the underlayer; the underlayer of low resistance paste being partially disconnected to define a gap, and a resistance if formed integrally with the upperlayer of a relatively high resistance paste at a position corresponding to the gap; the other insulative film being provided on a surface thereof facing the spacer with a plurality of second electrodes at positions corresponding to the first electrodes, respectively, and second line patterns for externally connecting the second electrodes.

In a sheet switch of this invention, the resistances formed on one of the insulative films serve to detect a "bypass signal flow" when three or more switch elements are simultaneously turned on, i.e., when three or more first electrodes formed on one of the insulative films simultaneously come into contact with the corresponding second electrodes formed on the other insulative film. Also, according to this invention, such resistances can be easily formed at the same time as the conductive line patterns are formed on the same insulative film.

DESCRIPTION OF THE PREFERRED EMBODIMENTS

Figure 1:
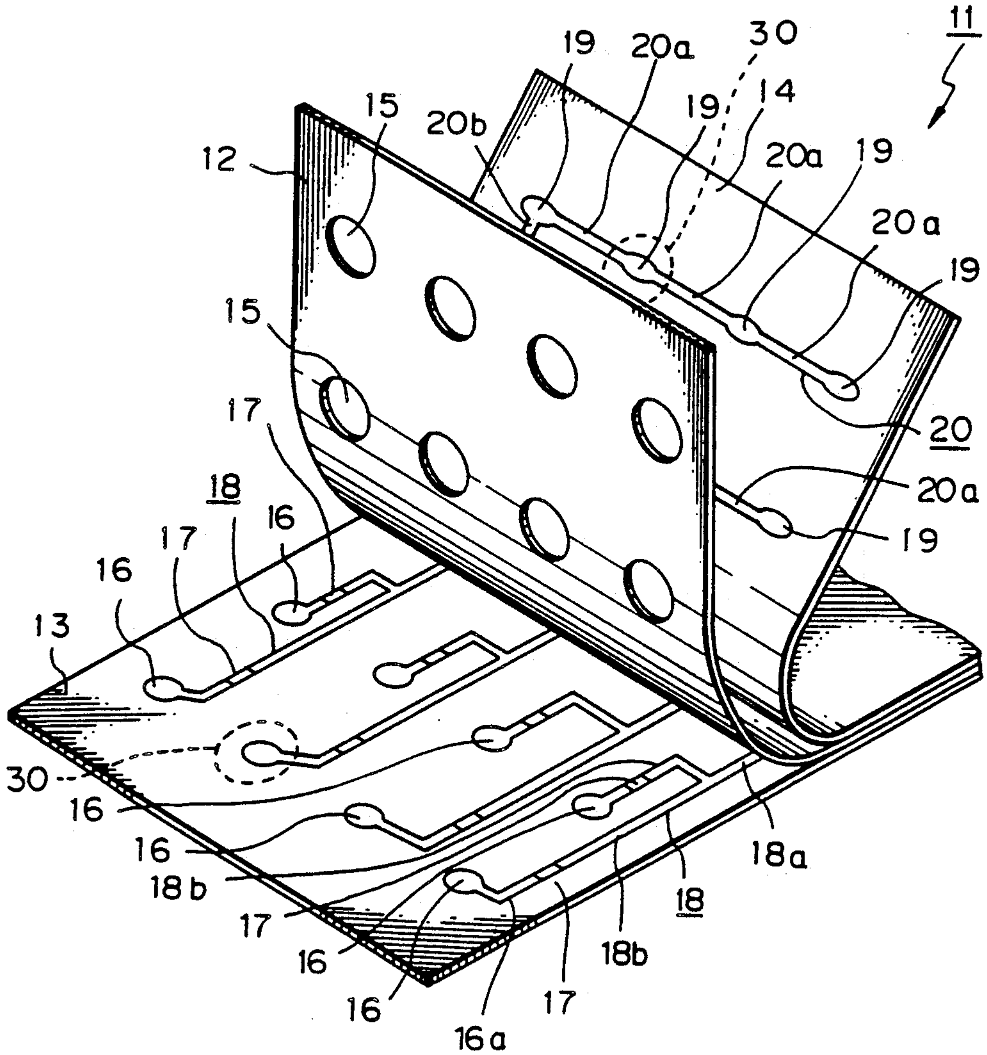
FIG. 1 is a perspective view of a sheet switch according to this invention, illustrating an upper insulative film and a spacer partially peeled from an under layer insulative film.

Referring now to the drawings, wherein a sheet switch 11 of this invention shown in FIG. 1 comprises an insulative film spacer 12 having a plurality of through holes 15 and a pair of flexible insulative films 13 and 14 arranged so that the spacer 12 is laminated therebetween. The spacer 12 and insulative films 13 and 14 are preferably made of a suitable plastic film, for example, a polyester film. The thickness of the spacer 12 is preferably 125 $\mu$, and is preferably composed of a rubber, such as a silicon rubber, which is formed by printing.

One of the insulative films 13 is provided on a contact surface thereof facing the spacer 12, i.e., an upper surface thereof, with a plurality of first electrodes 16 at positions corresponding to the through holes 15, respectively, resistances 17 having one ends connected to the electrodes 16 via leading lines **16*a*, respectively, and conductive patterns 18 to which the other ends of the resistances 17 are connected, respectively. The conductive patterns 18 comprise a plurality of main lines 18*a* corresponding to a plurality of X-lines 1 extending in the X-direction in FIG. 9 (or Y-lines 3 extending in the Y-direction) and branch or sub-lines 18*b* for connecting the respective resistances 17 arranged along the X-lines, for example, to the corresponding main lines 18*a***.

The other insulative film 14 is also provided on a contact surface thereof facing the spacer 12, i.e., a lower surface thereof, with a plurality of second electrodes 19 at positions corresponding to the first electrodes 16, respectively, and a plurality of second conductive patterns 20 for connecting the second electrodes 19 to external terminals (not shown). The second conductive patterns 20 correspond to Y-lines 3 extending in the Y-direction in FIG. 9 (or X-lines 1 extending in the X-direction and comprises connecting portions 20*a* for connecting adjacent electrodes 19 arranged in series along, for example, Y-lines (X-lines), and main lines 20*b* for connecting the series of electrodes 19 arranged in Y-lines (X-lines) to external terminals (not shown).

The electrodes 16 are 19 and the conductive patterns 18 and 20 are preferably formed by, for example, a printing process, as a double structured layer, in which a high conductive layer made of, for example, silver paste, and a migration preventing low resistance layer made of, for example, carbon paste, is coated over the high conductive layer. Alternatively, such patterns may be formed by, for example, a printing process, as a single layer made of any suitable material having a relatively low resistance.

Although FIG. 1 illustrates this sheet switch 11 as if the spacer 12 and the insulative film 14 are peeled from the insulative film 13, the insulative films 13 and 14 and the spacer 12 constitute a laminated structure, in which small gaps are provided between the respective electrodes 16 and 19 of the insulative films 13 and 14, respectively, by the spacer 12.

The spacer 12 can be omitted if suitable insulative rims or ridges, as shown by dotted lines at 30 in FIG. 1, are coated around the respective electrodes 16 and 19 to provide the above-mentioned small gaps therebetween when the insulative films 13 and 14 are mutually laminated, and to prevent an electrical contact between the conductive patterns on the insulative films 13 and those on the insulative films 14.

The sheet switch 11 of this invention as mentioned above is used as follows. When the upper surface of the upper insulative film 14 provided with the electrodes 19 is pressed by any key (not shown), the insulative film 14 is resiliently deformed, and thus the electrode 19 located at the position of the pressed key comes into contact with the corresponding electrode 16 of the lower insulative film 13 via the corresponding through hole 15 of the spacer 12, whereby a particular switch element 5 (FIG. 9) in a key board is tuned on. When the operator releases the key, the insulative film 14 is returned under its own resiliency to an initial state and, therefore, the electrode 19 moves away from the corresponding electrode 16, whereby the particular switch element 5 (FIG. 9) is turned off.

FIG. 2 to 7 illustrate embodiments of the resistance 17 (FIG. 1) having one end connected to the electrode 16 via the lead line (conductive layer) 16*a* and the other end connected to the main line 18*a* via the branch line (conductive layer) 18*b*.

Figure 2A:
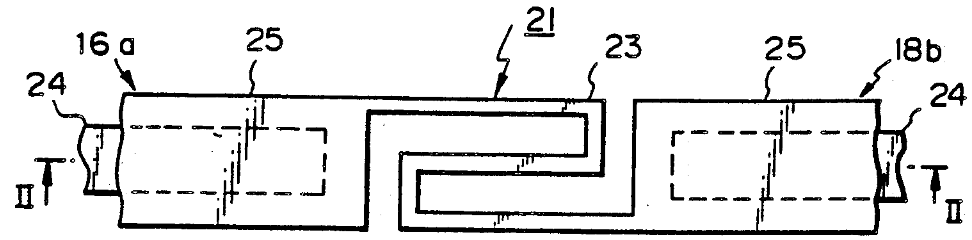
FIGS. 2A and 2B are plan and cross-sectional views of one embodiment of a resistance used in a sheet switch of this invention.
Figure 2B:
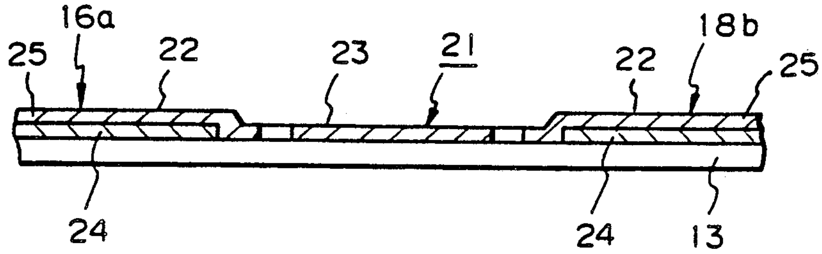

In an embodiment shown in FIG. 2A and 2B, a resistance 17 generally denoted at reference numeral 21 is a layer made of a relatively high resistance material, such as a carbon paste. On the other hand, each of the conductive layers 16*b* and 18B is a laminated structure consisting of an underlayer 24 made of a low resistance material, such as silver, and an upper layer 25 made of a relatively high resistance material such as a carbon paste, similar to the material of the resistance 17.

In other words, a pattern of low resistance conductive (silver paste) lines 24 is first formed by a printing process on the upper surface of the insulative film 13, in such a manner that such conductive lines 24 are partially disconnected from each other to define gaps 26 at positions on which the resistances 21 will be later formed. Then, a pattern of high resistance (carbon paste) lines 25 having a resistivity of, for example, several decades Ω per square (Ω/□), is coated by a printing process along and over the conductive lines 24 in such a manner that the high resistance lines 25 are connected at the gaps 26 to obtain desired resistances 21 at the respective positions of the gaps 26.

The shape, thickness and so forth of this resistance 21 can be selected to have a desired resistance value. As shown in FIG. 2A, the resistance 21 is defined by a fine line 23, the width thereof being much smaller than that of the high resistance line 25 on the conductive line 24. Also, the length of the resistance line 23 is much longer than that of the gap 26, since the line 23 is bent into a reversed S-shape.

Each of the electrodes 16 (FIG. 1) connected to the respective lead lines 16*a* and the main lines 18*a*connected to the branch lines 18*b* also can be formed by a laminated structure consisting of a relatively low resistance underlayer 24 and a relatively high resistance upper layer 25, in the same manner as and integrally with the lead lines 16*a* and branch lines 18*b*.

Figure 3A:
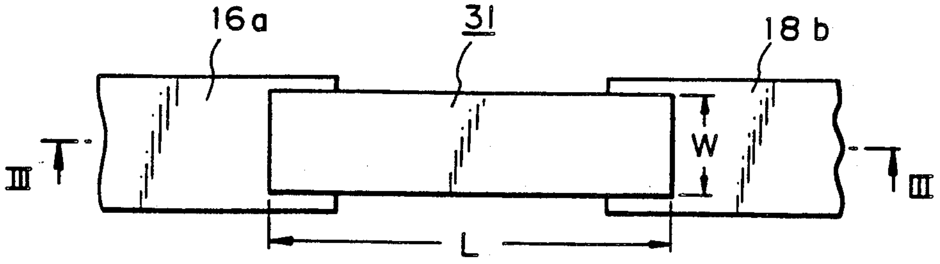
FIGS. 3A and 3B are plan and cross-sectional views of another embodiment of the resistance.
Figure 3B:
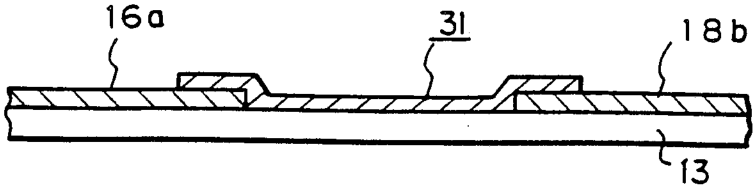

In an embodiment shown in FIG. 3A and 3B, each of the conductive layers 16*b* and 18*b* is a single layer made of a relatively low resistance material, such as a carbon paste, having a resistivity of, for example, several decades Ω per square (Ω/□). On the other hand, a resistance 31 corresponding to the resistance 17 in FIG. 1 may be made of a relatively high resistance material, such as a ruthenium paste, having a resistivity of, for example, 1 M Ω per square (Ω/□). As seen from FIG. 3A and 3B, in this embodiment, such a paste (resistance) 31 is formed only over the gap 32 between the conductive layers 16*b* and 18*b*, and is not connected thereto at the respective ends thereof.

Also, in this embodiment, each of the electrodes 16 (FIG. 1) and the main lines 18*a* also can be formed by the same conductive material as the lead lines 16*a* and branch lines 18*b*, and can be formed integrally therewith.

The length L and width W of the layer 31 should be selected to have a desired resistance value, and accordingly, a resistance value $R_L$ of the conductive layers including the lines 16*a*, 18*a*, or 18*b* and a resistance value $R_H$ of the resistance layer 31 should be selected as: $R_L/R_H \leqq 0.1$ As a result, the voltage for detecting a "bypass signal flow" in this switch can be reduced to +10% and, therefore, a sufficient margin can be allowed in the circuit for detecting such a "bypass signal flow", as discussed later.

Figure 4:
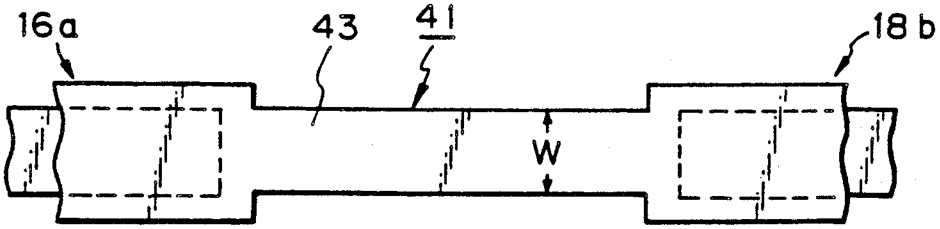
FIG. 4 is a plan view of still another embodiment of the resistance.

FIG. 4 shows a further embodiment similar to that of FIGS. 2A and 2B. A resistance layer 41 in this embodiment has a width W at the gap between the conductive layers 16*b* and 18*b*.

Further embodiments shown in FIGS. 5 to 8 are similar to the embodiments shown in FIGS. 2A and 2B, or FIG. 4, except that the gap between the conductive layers 16*b* and 18*b* is connected by a plurality of patterns which cooperate to constitute a resistance corresponding to the resistance 17 shown in FIG. 1. In these embodiments, even if one of the resistance patterns is damaged so that the resistance value thereof is greatly changed, the other resistance pattern or patterns would cover the damage.

Figure 5:
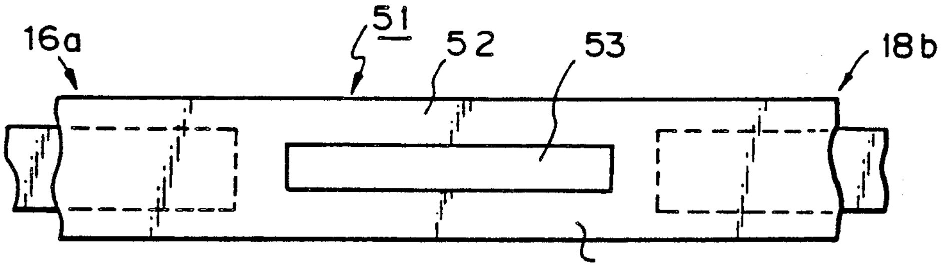
FIGS. 5 to 7 are plan views of embodiments of the resistance having a plurality of patterns.

In an embodiment shown in FIG. 5, a resistance 51 for connecting the gap between the conductive layers 16*a* and 18*b* comprises two resistance patterns 51 arranged in parallel to each other. In other words, the resistance layer 51 has one longitudinal groove 53 dividing the resistance 51 from the two patterns 52.

Figure 6:
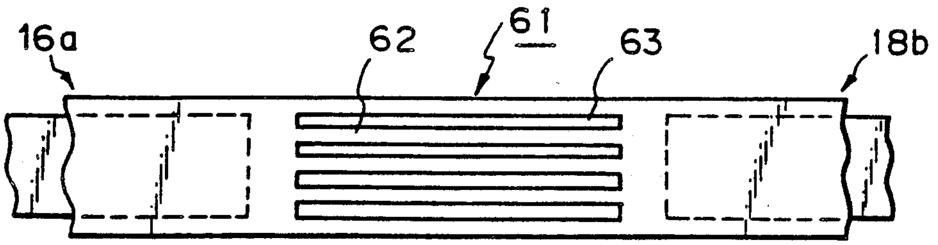

In FIG. 6, a resistance 61 comprises five resistance patterns 62 arranged in parallel to each other. In other words, the resistance layer 61 has four parallel grooves 63 dividing the resistance 61 from the five patterns 62. The width of these patterns 62 is, of course, much smaller than that of the pattern 52 in FIG. 5.

Figure 7:
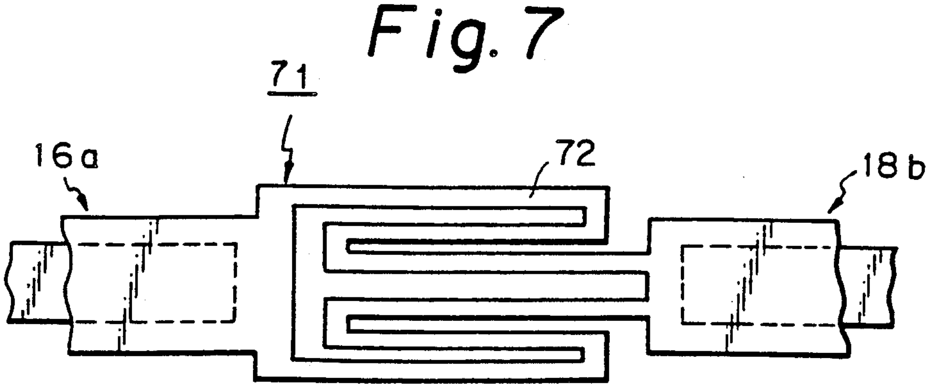

In FIG. 7, a resistance 71 comprises a pair of resistance patterns 72 arranged symmetrically to each other. Each of the resistance patterns 72 is defined by a fine line, the width of which is about the same as but the length of which is much longer than the pattern 62 in FIG. 6, since the pattern 72 in this embodiment is bent into an S-shape or reversed S-shape, similar to the embodiment of FIGS. 2A and 2B.

Figure 8:
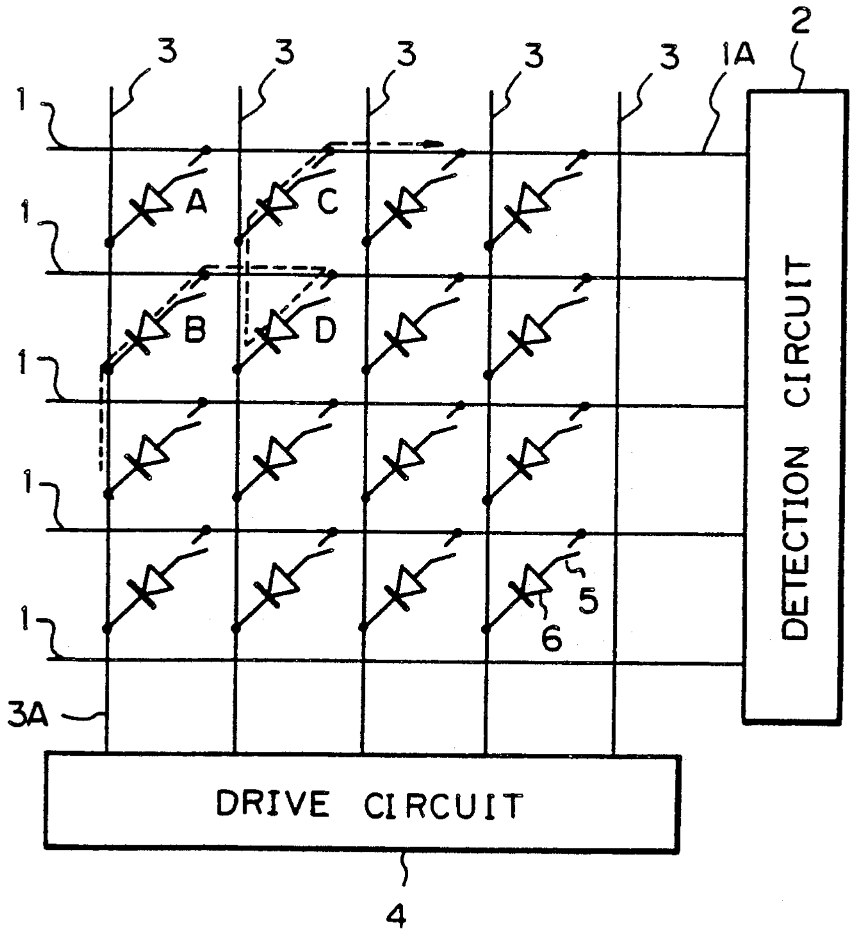
Fig. 8 (PRIOR ART)
FIG. 8 illustrates an example of a circuit of a key board matrix switch known in the prior art.

FIG. 8 illustrates an example of a circuit of a key board switch, particularly an N-key roll-over type switch matrix known in the prior art. A plurality of X-lines 1 are connected to a detection circuit 2, but on the other hand, a plurality of Y-lines 3 are connected to a drive circuit 4. The respective X-lines 1 and Y-lines 3 are connected by a plurality of switch elements 5 and diodes 6, i.e., each of the switch elements 5 has one end connected to the X-line 1 and the other end connected to the diode 6 which is connected to the Y-line 3.

The diodes 6 serve to prevent a bypass signal flow from the drive circuit 4 to the detection circuit 2, when the operator depresses three or more corresponding keys (not shown) so that three or more switch elements 5 are simultaneously turned on. For example, even though the switch elements B, C, and D are simultaneously turned on in place of the switch element A, the diode 6 adjacent to the switch element D does no allow the signal to flow in the opposite direction and, therefore, prevents the signal from flowing via the particular Y-line 3A and X-line 1A, as shown by a dotted line. Thus, only when the switch element A is turned on does the signal flows from the drive circuit 4 to the detection circuit 2 via the particular Y-line 3A and X-line 1A.

Figure 9:
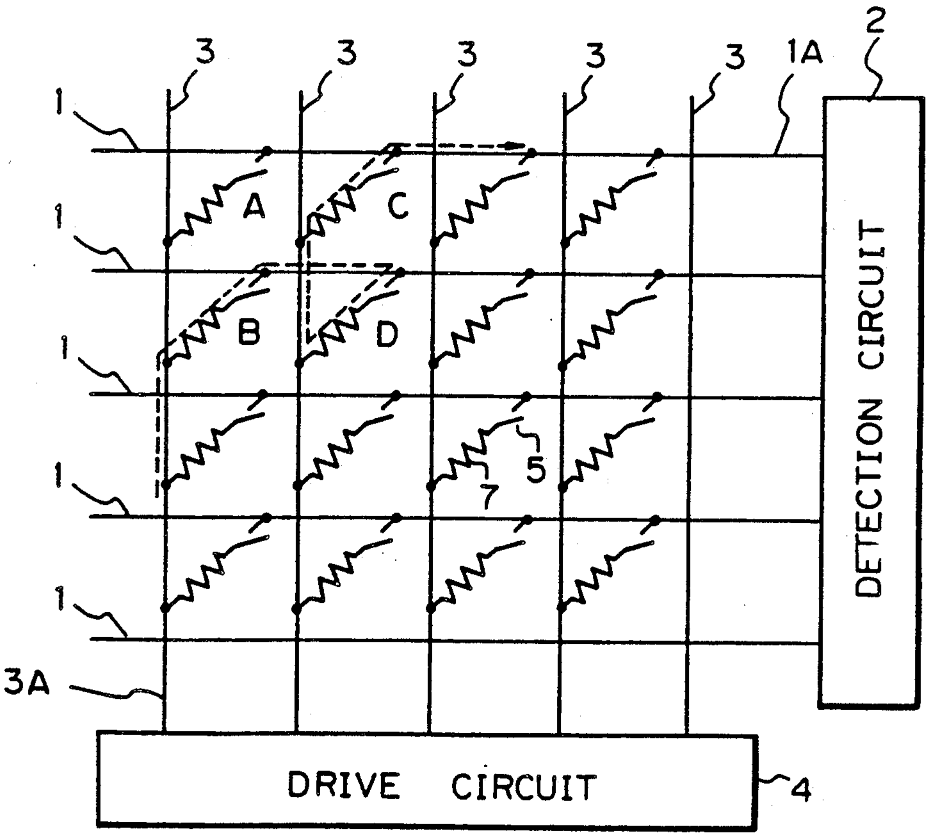
FIG. 9 illustrates a circuit of a key board matrix switch which can be constructed by a sheet switch of this invention.

FIG. 9 illustrates a circuit of a key board switch, particularly an N-key roll-over type switch matrix, which can be constituted by a sheet switch of this invention. Similar to FIG. 8, a plurality of X-lines 1 are connected to a detection circuit 2, a plurality of Y-lines 3 are connected to a drive circuit 4, and the respective X-lines 1 and Y-lines 3 are connected by a plurality of switch elements 5. Note, a plurality of resistances 7 are used in place of the diodes 6 in FIG. 8.

The resistances 7 serve to detect a bypass signal flow from the drive circuit 4 to the detection circuit 2, when the operator depresses three or more corresponding keys (not shown) so that three or more switch elements 5 are simultaneously turned on. For example, if the switch elements B, C, and D are simultaneously turned on in place of the switch element A, a signal flows from the particular X-line 1A to the particular Y-line 3A via the three resistances 7 adjacent to the switch elements B, C, and D, as shown by a dotted line. But if only the switch element A is turned on, a signal flows from the particular X-line 1A to the particular Y-line 3A via only one resistance 7 adjacent to the switch element A. Accordingly, a bypass signal flow can be detected in the detection circuit 2 by the difference in the value of the resistance detected by the detection circuit.

As will be understood, the switch elements 5 in FIG. 9 correspond to the pairs of electrodes 16 and 19 formed on the insulative films 13 and 14, respectively, and the resistance 7 in FIG. 9 correspond to the resistances 17 in FIG. 1 formed on the insulative film 13.

We claim:

1. A sheet switch comprising:

an insulative film spacer having a plurality of through holes, said spacer being laminated between a pair of flexible insulative films;

a first one of said pair of flexible insulative films being provided on a surface thereof facing said spacer and including:

a plurality of first electrodes at positions corresponding to said through holes, respectively;

resistances connected to said first electrodes, respectively; and first line patterns for externally connecting said first electrodes via said resistances;

each of said first line patterns being a laminated structure including:

an underlayer formed of a relatively low resistance paste; and an upper layer formed of a relatively high resistance paste coated cover said underlayer, a width of said relatively high resistance paste being larger than a width of said relatively low resistance paste;

said underlayer formed of said relatively low resistance paste being partially disconnected to define a gap, so that said resistance is integrally formed with said upper layer formed of said relatively high resistance paste at a position corresponding to said gap, the width of said relatively high resistance paste being reduced at a position corresponding to said gap to define an essential part of said resistance;

a second one of said pair of insulative films being provided on a surface thereof facing said spacer and including:

a plurality of second electrodes at positions corresponding to said first electrodes, respectively; and second line patterns for externally connecting said second electrodes.

2. A sheet switch as set forth in claim 1, wherein a relationship between a resistance value $R_H$ of said relatively high resistance paste and a resistance value $R_L$ of said relatively low resistance paste is: $R_L/R_H \leqq 0.1$.

3. A sheet switch as set forth in claim 1, wherein said relatively high resistance paste is a carbon paste and said relatively low resistance paste is a silver paste.

4. A sheet switch as set forth in claim 1, wherein said spacer is made of a plastic film such as polyester.

5. A sheet switch as set forth in claim 1, wherein said spacer is made of a silicon rubber.

6. A sheet switch as set forth in claim 1, wherein said flexible insulative films are made of a plastic film such as polyester.

7. A sheet switch as set forth in claim 1, wherein said plurality of resistance patterns are parallel to each other.

8. A sheet switch as set forth in claim 1, wherein each of said resistance patterns is bent into one of an S-shape, a reversed S-shape, or a zig-zag, so that a length of said resistance pattern is larger than that of said gap.

9. A sheet switch comprising:

a pair of flexible insulative films laminated to each other;

a first one of said pair of insulative films being provided on a surface thereof facing a second one of said pair of insulative films including:

a plurality of first electrodes;

resistances connected to said first electrodes, respectively; and first line patterns for externally connecting said first electrodes via said resistances;

each of said first line patterns being a laminated structure including:

an underlayer formed of a relatively low resistance paste; and an upper layer formed of a relatively high resistance paste coated over said underlayer;

said underlayer formed of said low resistance paste being partially disconnected to define a gap, so that said resistances are formed integrally with said upper layer formed of said relatively high resistance paste at a position corresponding to said gap, a width of said relatively high resistance paste being larger than a width of said relatively low resistance paste, the width of said relatively high resistance paste being reduced at a position corresponding to said gap to define an essential portion of said resistance;

a second one of said pair of insulative films being provided on a surface thereof facing said first insulative film and including:

a plurality of second electrodes at positions corresponding to said first electrodes, respectively; and second line patterns for externally connecting said second electrodes;

means for defining a space between each of said first electrodes formed on said first insulative film and said second electrodes formed on said second insulative film; and means for electrically insulating said first line patterns formed on said first insulative film and said second line patterns formed on said second insulative film.

10. A sheet switch as set forth in claim 9, wherein a relationship between a resistance value $R_H$ of said relatively high resistance paste and a resistance paste is: $R_L/R_H \leqq 0.1$.

11. A sheet switch as set forth in claim 9, wherein said relatively high resistance paste is a carbon paste and said relatively low resistance paste is a silver paste.

12. A sheet switch as set forth in claim 9, wherein said flexible insulative films are made of a plastic film such as polyester.

13. A sheet switch comprising:

an insulative film spacer having a plurality of through holes, said spacer being laminated between a pair of flexible insulative films;

a first one of said pair of flexible insulating films provided on a surface of said spacer and including:

a plurality of first electrodes located at positions corresponding to said through holes;

resistances respectively connected to said first electrodes and including a plurality of resistance patterns;

first line patterns for externally connecting said first electrodes via said resistances, each of said first line patterns comprising a laminated structure, including:

an underlayer formed of a relatively low resistance paste; and an upper layer formed of a relatively high resistance paste coated over said underlayer, a width of said relatively high resistance paste being larger than a width of said relatively low resistance paste;

said underlayer formed of said relatively low resistance paste and partially disconnected to define a gap, said resistances integrally formed with said upper layer at a position corresponding to said gap and said resistance patterns formed over said gap, a total width of said resistance patterns being smaller than the width of said relatively high resistance paste;

a second one of said pair of flexible insulative films being provided on a surface of said spacer and including:

a plurality of second electrodes located at positions corresponding to said first electrodes, respectively, and second line patterns for externally connecting said second electrodes.

14. A sheet switch as set forth in claim 13, wherein said plurality of resistance patterns are parallel to each other.

15. A sheet switch as set forth in claim 13, wherein each of said resistance patterns is bent into one of an S-shape, a reversed S-shape, or a zig-zag, so that a length of said resistance pattern is larger than that of said gap.

16. A sheet switch comprising:

a pair of flexible insulative films laminated to each other;

a first one of said pair of flexible insulative films facing a second one of said pair of insulative films, said first one of said flexible insulative films comprising:

a plurality of first electrodes;

resistances respectively connected to said first electrodes and including a plurality of resistance patterns; and first line patterns for externally connecting said first electrodes via said resistances;

each of said first line patterns being a laminated structure including:

an underlayer formed of a relatively low resistance paste; and an upper layer formed of a relatively high resistance paste coated over said underlayer;

said underlayer being partially disconnected to define a gap so that said resistances are integrally formed with said upper layer at a position corresponding to said gap, said resistance patterns being formed over said gap, the width of said relatively high resistance paste being larger than a width of said relatively low resistance paste, a total width of said resistance patterns being smaller than the width of said relatively high resistance paste;

a second one of said pair of flexible insulative films facing said first one of said pair of flexible insulative films; said second one of said flexible insulative films comprising:

a plurality of second electrodes formed at positions corresponding to said first electrodes, respectively; and second line patterns for externally connecting said second electrodes;

means for defining a space between each of said first electrodes formed on said first insulative film and said second electrodes formed on said second insulative film; and means for electrically insulating said first line patterns formed on said first insulative film and said second line patterns formed on said second insulative film.

* * * * *